(12) United States Patent
Lee et al.

(10) Patent No.: US 12,513,574 B2
(45) Date of Patent: Dec. 30, 2025

(54) NETWORK MANAGEMENT SYSTEM AND METHOD OF AUTOMATIC ADJUSTMENT FOR VIRTUALIZED BASE STATION

(71) Applicant: Industrial Technology Research Institute, Hsinchu (TW)

(72) Inventors: Chung-Lai Lee, New Taipei (TW); Yao-Jen Tang, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 18/421,992

(22) Filed: Jan. 25, 2024

(65) Prior Publication Data

US 2025/0142416 A1    May 1, 2025

(30) Foreign Application Priority Data

Oct. 31, 2023   (TW) ................................. 112141710

(51) Int. Cl.
*H04W 28/26*  (2009.01)
*H04L 41/40*  (2022.01)

(52) U.S. Cl.
CPC ............. *H04W 28/26* (2013.01); *H04L 41/40* (2022.05)

(58) Field of Classification Search
CPC ......... H04L 41/00; H04L 41/40; H04L 41/12; H04W 28/26; H04W 24/00–04;
(Continued)

(56) References Cited

U.S. PATENT DOCUMENTS

| 10,367,911 B1 | 7/2019 | Combs et al. |
| 10,582,340 B2 | 3/2020 | Botti et al. |

(Continued)

FOREIGN PATENT DOCUMENTS

| CN | 101094494 | 12/2007 |
| CN | 107426797 | 12/2017 |

(Continued)

OTHER PUBLICATIONS

Tianjiao Chen et al., "Virtual Network Embedding Algorithm for Location-Based Identifier Allocation", IEEE Access, vol. 7, Mar. 7, 2019, pp. 31159-31169.

(Continued)

*Primary Examiner* — Marcus Smith
*Assistant Examiner* — Rowan K Fakhro
(74) *Attorney, Agent, or Firm* — JCIPRNET (57) ABSTRACT

A network management system and a method of automatic adjustment for a virtualized base station are provided. The method includes following steps. A user equipment (UE) information table is queried from a core network, and a first reserved resource of a first virtualized base station is queried, where the UE information table includes first location information and a first resource requirement corresponding to a first UE set. A second resource requirement corresponding to a second UE set is obtained from the UE information table based on the first location information and a default range. Whether the first reserved resource matches the second resource requirement is determined to generate a determination result. The first reserved resource of the first virtualized base station is expanded or reduced based on the determination result.

11 Claims, 8 Drawing Sheets

(58) Field of Classification Search
CPC .............. H04W 24/10; H04W 72/00; H04W 24/02–04; H04W 72/27–29; H04W 88/085
See application file for complete search history.

(56) References Cited

U.S. PATENT DOCUMENTS

| | | | |
|---|---|---|---|
| 11,425,054 | B1 | 8/2022 | Dunsmore et al. |
| 11,539,970 | B2 | 12/2022 | Zhang et al. |
| 11,665,589 | B2 | 5/2023 | Kotaru et al. |
| 2007/0081507 | A1 | 4/2007 | Koo et al. |
| 2010/0178928 | A1 | 7/2010 | O'Reilly |
| 2016/0373889 | A1 | 12/2016 | Klein et al. |
| 2019/0272509 | A1 | 9/2019 | Livnat et al. |
| 2022/0021590 | A1* | 1/2022 | Seetharaman ...... H04L 41/5051 |
| 2022/0132524 | A1* | 4/2022 | Mueck .............. H04W 72/1215 |
| 2022/0141670 | A1 | 5/2022 | Goldhamer |
| 2022/0357969 | A1 | 11/2022 | Saurabh et al. |
| 2024/0298206 | A1* | 9/2024 | Yao ...................... H04W 52/367 |
| 2024/0305533 | A1* | 9/2024 | Bai ........................ H04W 24/02 |

FOREIGN PATENT DOCUMENTS

| | | |
|---|---|---|
| CN | 107690822 | 2/2018 |
| CN | 108076531 | 5/2018 |
| CN | 104955172 | 1/2019 |
| CN | 113453285 | 9/2021 |
| CN | 115734229 | 3/2023 |
| EP | 2901735 | 2/2019 |
| TW | 201706839 | 2/2017 |

OTHER PUBLICATIONS

William Wei-Liang Li et al., "Robust Power Allocation for Energy-Efficient Location-Aware Networks", IEEE/ACM Transactions on Networking, vol. 21, No. 6, Dec. 2013, pp. 1918-1930.

Maurizio Rea et al., "Location-Aware Wireless Resource Allocation in Industrial-Like Environment", IEEE Transactions on Mobile Computing, vol. 22, No. 2, Feb. 2023, pp. 1025-1035.

Qi Yang et al., "Location Based Joint Spectrum Sensing and Radio Resource Allocation in Cognitive Radio Enabled LTE-U Systems", IEEE Transactions on Vehicular Technology, vol. 69, No. 3, Mar. 2020, pp. 2967-2979.

Jiechen Chen et al., "Joint Resource Allocation and Cache Placement for Location-Aware Multi-User Mobile-Edge Computing", IEEE Internet of Things Journal, vol. 9, No. 24, Dec. 15, 2022, pp. 25698-25714.

Haibin Niu et al., "3D Location and Resource Allocation Optimization for UAV-Enabled Emergency Networks Under Statistical QoS Constraint", IEEE Access, vol. 9, Mar. 19, 2021, pp. 41566-41576.

"Office Action of Japan Counterpart Application", issued on May 28, 2025, p. 1-p. 5.

"Office Action of Taiwan Counterpart Application", issued on Feb. 14, 2025, p. 1-p. 14.

* cited by examiner

NETWORK MANAGEMENT SYSTEM AND METHOD OF AUTOMATIC ADJUSTMENT FOR VIRTUALIZED BASE STATION

CROSS-REFERENCE TO RELATED APPLICATION

This application claims the priority benefit of Taiwan application serial no. 112141710, filed on Oct. 31, 2023. The entirety of the above-mentioned patent application is hereby incorporated by reference herein and made a part of this specification.

TECHNICAL FIELD

The disclosure relates to a network management system and a method of automatic adjustment for a virtualized base station.

BACKGROUND

At present, telecommunication (telecom) operators employ conventional techniques, i.e., fixed maximum network resource allocation, to fulfill end-service requirements. However, the resource demands associated with next-generation mobile network applications, such as extended reality (XR) services, are on the rise, leading to increased energy consumption. In line with the worldwide movement towards energy conservation and carbon reduction, the conventional approach of expending maximum network resources becomes economically impractical. Therefore, the telecom operators are compelled to embrace energy-efficient network resource allocation technologies.

The emergence of a virtualized base station technology introduces dynamic network resource allocation capabilities that have the potential to significantly mitigate network resource inefficiencies for the telecom operators. Nonetheless, existing technologies necessitate a resource allocation period for virtualized base stations, thus resulting in a temporal gap. This gap subsequently hinders the ability of the network management system to allocate resources in real-time within a dynamically evolving network, thereby impairing the capacity of the network management system to fulfill user service requirements promptly.

SUMMARY

One or more of the exemplary embodiments provide a network management system and a method of automatic adjustment for a virtualized base station, which may be applied for avoiding non-compliance with resource requirements of user equipment (UE) during a gap period arising from resource allocation for the virtualized base station.

One of the exemplary embodiments provides a network management system of automatic adjustment for a virtualized base station, and the network management system includes a processor, a storage medium, and a transceiver. The storage medium stores a plurality of modules. The processor is coupled to the storage medium and the transceiver and accesses and executes the modules. The modules include a monitoring entity, a user equipment (UE) information handler, a scaling configuration entity, and a virtualized radio access network (vRAN) management entity. The monitoring entity communicates with a core network through the transceiver. The UE information handler queries a UE information table from the core network through the monitoring entity and queries a first reserved resource of a first virtualized base station through the monitoring entity, where the UE information table includes first location information and a first resource requirement corresponding to a first UE set. The scaling configuration entity obtains a second resource requirement corresponding to a second UE set from the UE information table based on the first location information and a default range and determines whether the first reserved resource matches the second resource requirement to generate a determination result. The vRAN management entity expands or reduces the first reserved resource of the first virtualized base station based on the determination result.

One of the exemplary embodiments provides a method for automatic adjustment of a virtualized base station, and the method includes following steps. A UE information table is queried from a core network, and a first reserved resource of a first virtualized base station is queried, where the UE information table includes first location information and a first resource requirement corresponding to a first UE set. A second resource requirement corresponding to a second UE set is obtained from the UE information table based on the first location information and a default range, and whether the first reserved resource matches the second resource requirement is determined to generate a determination result. The first reserved resource of the first virtualized base station is expanded or reduced based on the determination result.

In light of the above, the UE resource requirements may be categorized, and resource allocation may be executed according to the categorization result according to one or more exemplary embodiments of the disclosure. This serves to avert situations where the UE resource requirements cannot be met during the gap period arising from resource allocation for the virtualized base station, consequently leading to a reduction in network resource wastage.

BRIEF DESCRIPTION OF THE DRAWINGS

The accompanying drawings are included to provide a further understanding of the disclosure, and the accompanying drawings are incorporated in and constitute a part of this specification. The drawings illustrate the exemplary embodiments of the disclosure, and together with the description, serve to explain the principle of the disclosure.

DETAILED DESCRIPTION OF DISCLOSURED EMBODIMENTS

Figure 1:
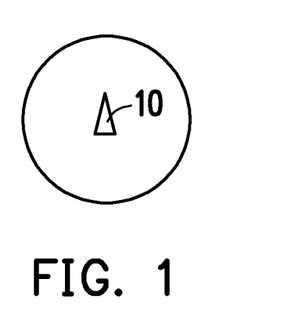
FIG. 1 is a schematic diagram illustrating a scenario of a virtualized base station composed of a single radio unit (RU) according to an exemplary embodiment of the disclosure.
Figure 2:
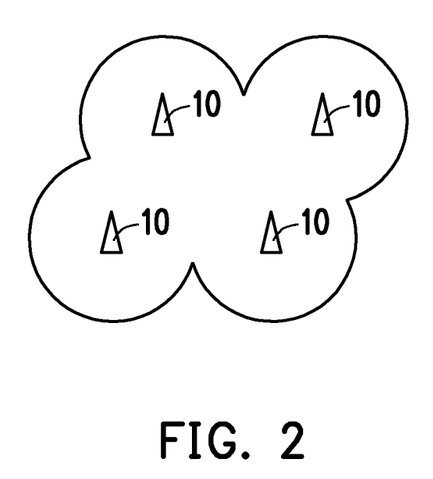
FIG. 2 is a schematic diagram illustrating a scenario of a virtualized base station composed of a plurality of cooperative RUs according to an exemplary embodiment of the disclosure.

In one or more exemplary embodiments of the disclosure, one or more default ranges may be determined for categorizing user equipment (UE) based on a service range of a virtualized base station composed of a single radio unit (RU), such as a virtualized base station 10 shown in FIG. 1, or based on a service range of a virtualized base station composed of a plurality of cooperative RUs, such as a virtualized base station 10 composed of a plurality of RUs shown in FIG. 2, and the amount of resources required to be consumed by the virtualized base station in the future may be estimated based on the categorization result.

Figure 3A:
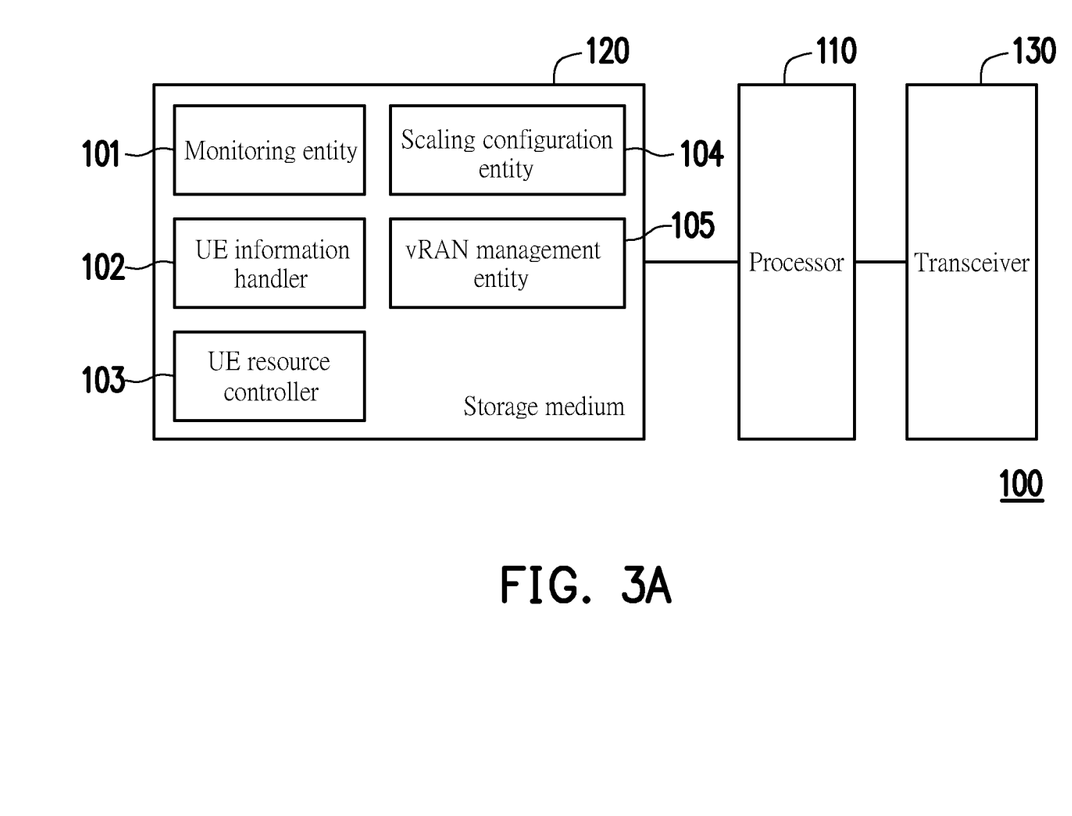
FIG. 3A and FIG. 3B are schematic diagrams illustrating a network management system for automatic adjustment of a virtualized base station according to an exemplary embodiment of the disclosure.
Figure 3B:
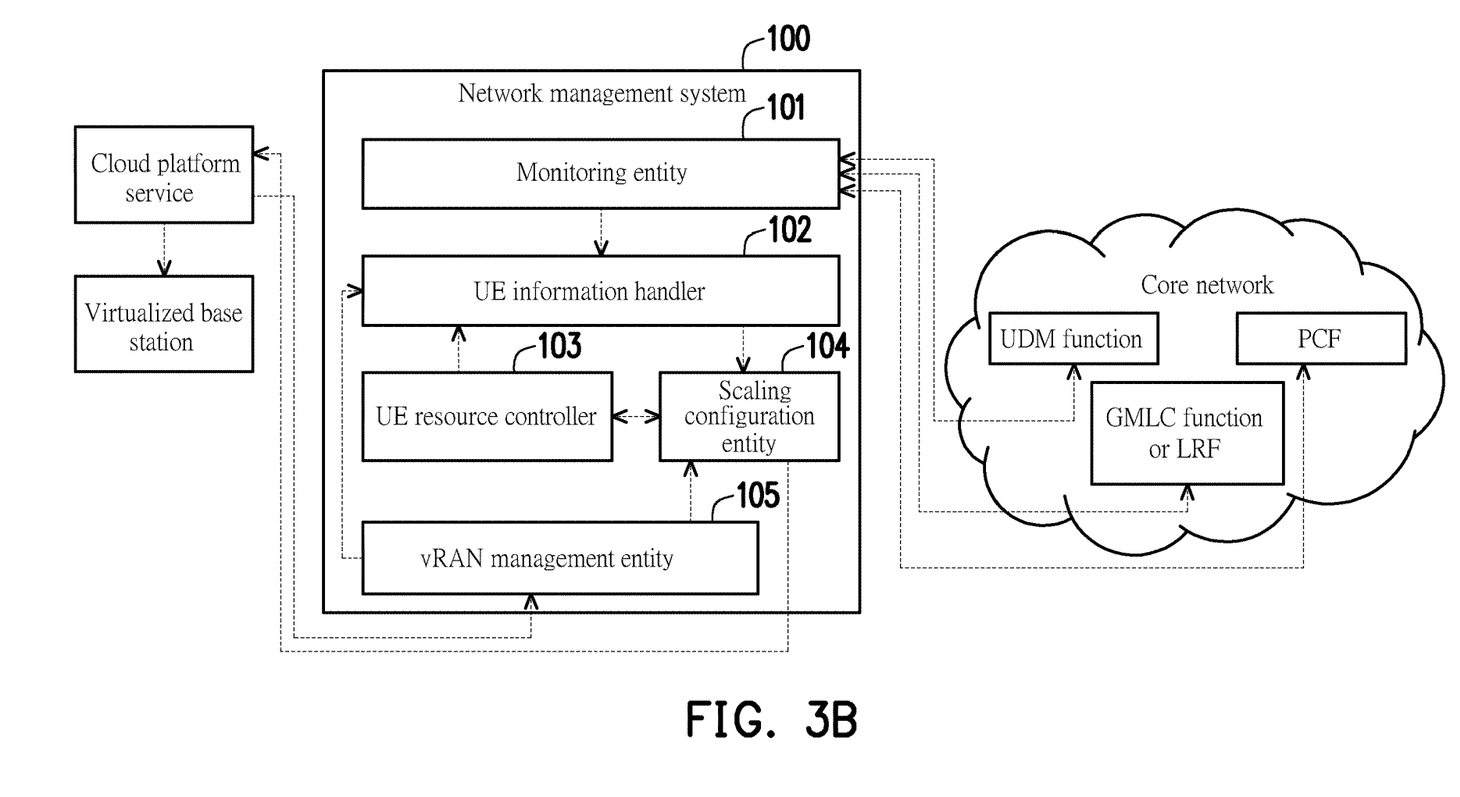

FIG. 3A and FIG. 3B are schematic diagrams illustrating a network management system 100 for automatic adjustment of a virtualized base station or a virtualized radio access network (vRAN) according to an exemplary embodiment of this disclosure. The network management system 100 may include a processor 110, a storage medium 120, and a transceiver 130.

The processor 110 includes, for instance, a central processing unit (CPU) or any other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), any other similar component, or a combination of the aforesaid components. The processor 110 may be coupled to the storage medium 120 and the transceiver 130 and may access and execute a plurality of modules and various applications stored in the storage medium 120.

The storage medium 120 is, for instance, any type of fixed or removable random access memory (RAM), read-only memory (ROM), flash memory, hard disk drive (HDD), solid state drive (SSD), similar components, or a combination of the aforesaid components, and the storage medium 120 is configured to store a plurality of modules or various applications that may be executed by the processor 110. In this exemplary embodiment, the storage medium 120 may store a plurality of modules including a monitoring entity 101, a UE information handler 102, a UE resource controller 103, a scaling configuration entity 104, and a vRAN management entity 105, and the functions of these modules are described below.

The transceiver 130 transmits or receives signals in a wireless manner or through a cable. The transceiver 130 may further perform low noise amplification, impedance matching, frequency mixing, frequency conversion in an upward or downward manner, filtering, amplification, and other similar operations. The monitoring entity 101 of the network management system 100 may communicate with a core network through the transceiver 130 to obtain information related to the virtualized base station or UE from the core network. In an exemplary embodiment, the monitoring entity 101 may communicate with a unified data management (UDM) function, a policy control function (PCF), a gateway mobile location center (GMLC) function, or a location retrieval function (LRF) in the core network through the transceiver 130. In an exemplary embodiment, the vRAN management entity 105 of the network management system 100 may communicate with a cloud platform service for managing the virtualized base station through the transceiver 130, where the cloud platform service may be rendered to manage one or a plurality of virtualized base stations which may include a central unit (CU) or distributed units (DU) belonging to the same CU. The network management system 100 may instruct the cloud platform service to expand or reduce the reserved resources for the virtualized base station through the transceiver 130.

Figure 4:
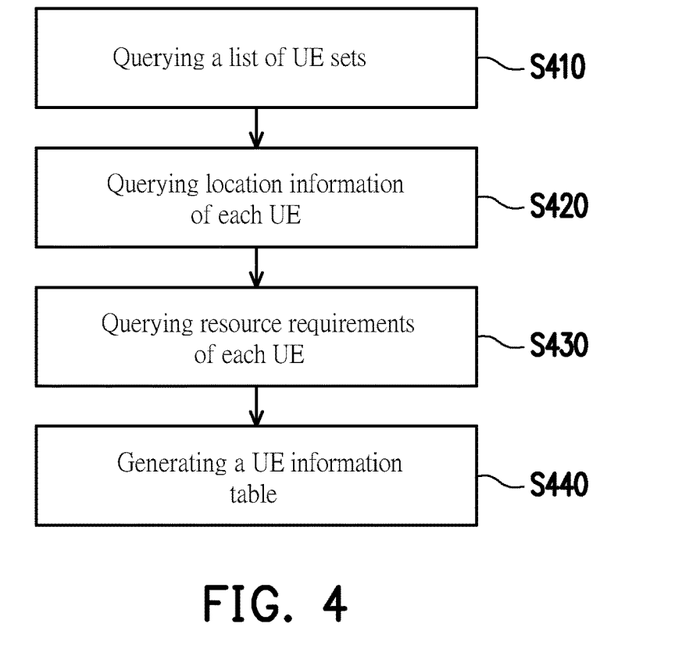
FIG. 4 is a flowchart illustrating a method for generating a user equipment (UE) information table according to an exemplary embodiment of the disclosure.

FIG. 4 is a flowchart illustrating a method for generating a UE information table according to an exemplary embodiment of this disclosure. The network management system 100 may periodically execute the process depicted in FIG. 4 to generate or update the UE information table.

Specifically, in step S410, the UE information handler 102 may, through the monitoring entity 101, query a list of UE sets through the UDM function of the core network. For instance, with reference to FIG. 6A, the UE information handler 102 may query all UEs in a specific area through the UDM function to obtain the list of the UE sets, where the UEs in the list include, for instance, UEs 71, 72, 73, 74, 75, 76, and 77.

As shown in FIG. 4, in step S420, the UE information handler 102 may, through the monitoring entity 101, query location information of each UE in the list of the UE sets through GMLC function or LRF of the core network. The location information includes, for instance, a distance between the UEs and the virtualized base station serving the UEs.

In step S430, the UE information handler 102 may, through the monitoring entity 101, query the resource requirements of each UE in the list of the UE sets through the PCF of the core network. The resource requirements may be represented by resource values, where the resource values include, for instance, service-level agreement (SLA) values, and the SLA values may include bandwidth information, latency information, or the like. Note that the order of steps S420 and S430 may be exchanged.

In step S440, the UE information handler 102 may generate a UE information table based on the list of the UE sets, the location information, and the resource requirements. The UE information table may include a list of UEs, the location information of each UE, and the resource requirements for each UE.

Figure 5:
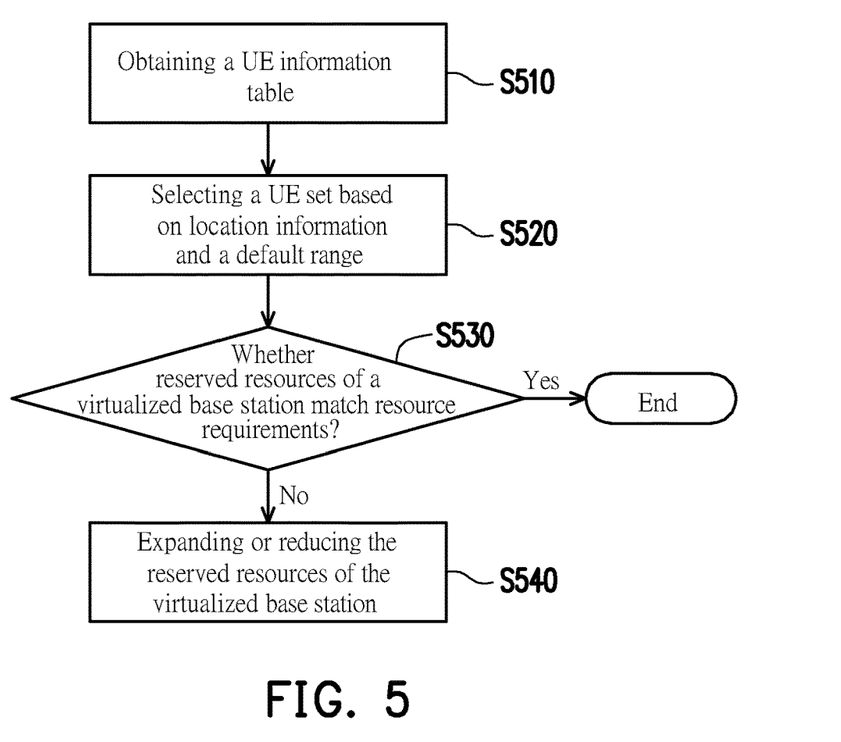
FIG. 5 is a flowchart illustrating a method for executing automatic expansion according to an exemplary embodiment of the disclosure.

FIG. 5 is a flowchart illustrating a method for executing automatic expansion according to an exemplary embodiment of the disclosure. The network management system 100 may periodically execute the process depicted in FIG. 5 to automatically expand or reduce the reserved resources of the virtualized base station.

In step S510, the scaling configuration entity 104 may obtain the UE information table from the UE information handler 102. The scaling configuration entity 104 may obtain the list of the UEs, the location information, and the resource requirements from the UE information table.

In step S520, the scaling configuration entity 104 may select a UE set that includes one or more UEs from the list of the UEs based on the location information and a default range, and the scaling configuration entity 104 may obtain the resource requirements (e.g., the SLA values and other resource values) of the selected UEs from the UE information table, where a service range of the virtualized base station is included in the default range. In other words, the default range may be greater than or equal to the service range of the virtualized base station.

Specifically, the scaling configuration entity 104 may obtain one or more default ranges pre-stored in the UE resource controller 103 from the UE resource controller 103. The scaling configuration entity 104 may determine whether the UE is located within the default range based on the location information of the UE, so as to categorize the UE.

Figure 6A:
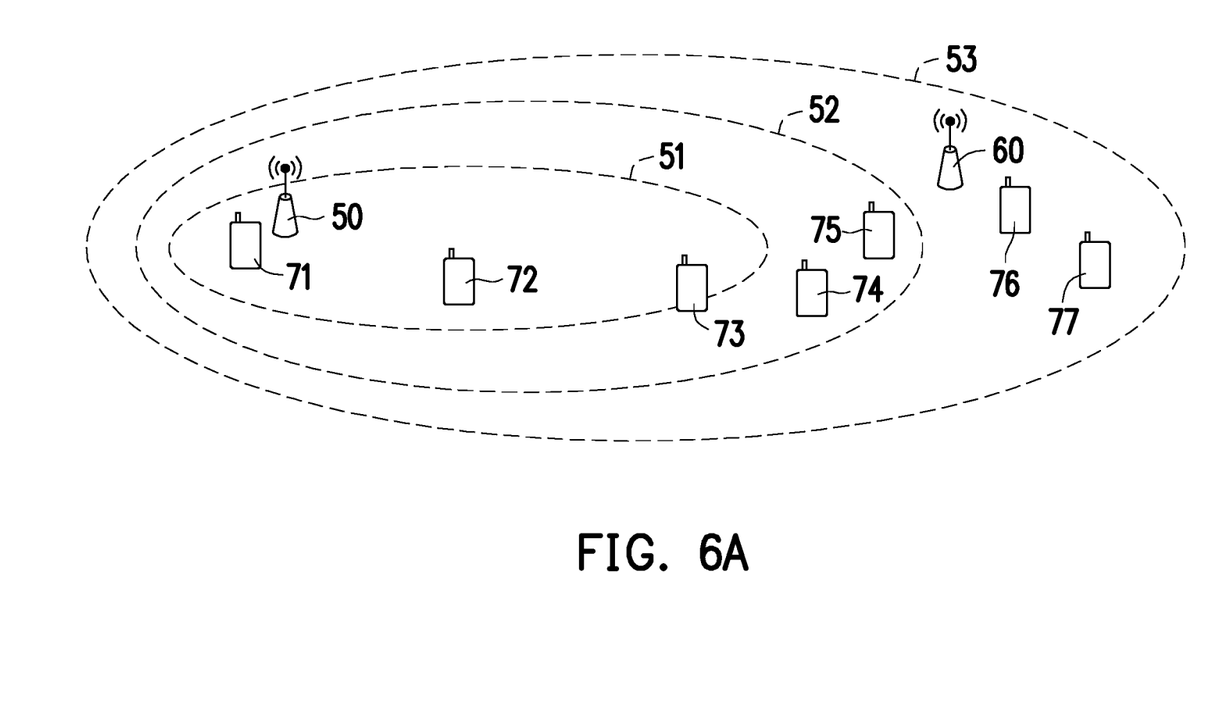
FIG. 6A and FIG. 6B are schematic diagrams illustrating a service range and a default range of a base station according to an exemplary embodiment of the disclosure.

For instance, with reference to FIG. 6A, a virtualized base station 50 has a service range 51. The scaling configuration entity 104 may categorize the UEs located within the service range 51 (i.e., UEs 71, 72, and 73) as belonging to level L1, categorize the UEs located outside the service range 51 and within a default range 52 (i.e., UEs 74 and 75) as belonging to level LX1, and categorize the UEs located outside the default range 52 and within a default range 53 (i.e., UEs 76 and 77) as belonging to level LX2. The scaling configuration entity 104 may generate an information table of the virtualized base station 50 as shown in Table 1 after completing steps S510 and S520.

TABLE 1

| UE | SLA value - bandwidth (bits per second) | SLA value - latency (millisecond) | Level |
|---|---|---|---|
| 71 | 100M | 100 | L1 |
| 72 | 80M | 100 | L1 |
| 73 | 100M | 50 | L1 |
| 74 | 150M | 80 | LX1 |
| 75 | 80M | 100 | LX1 |
| 76 | 100M | 80 | LX2 |
| 77 | 120M | 50 | LX2 |

Figure 6B:
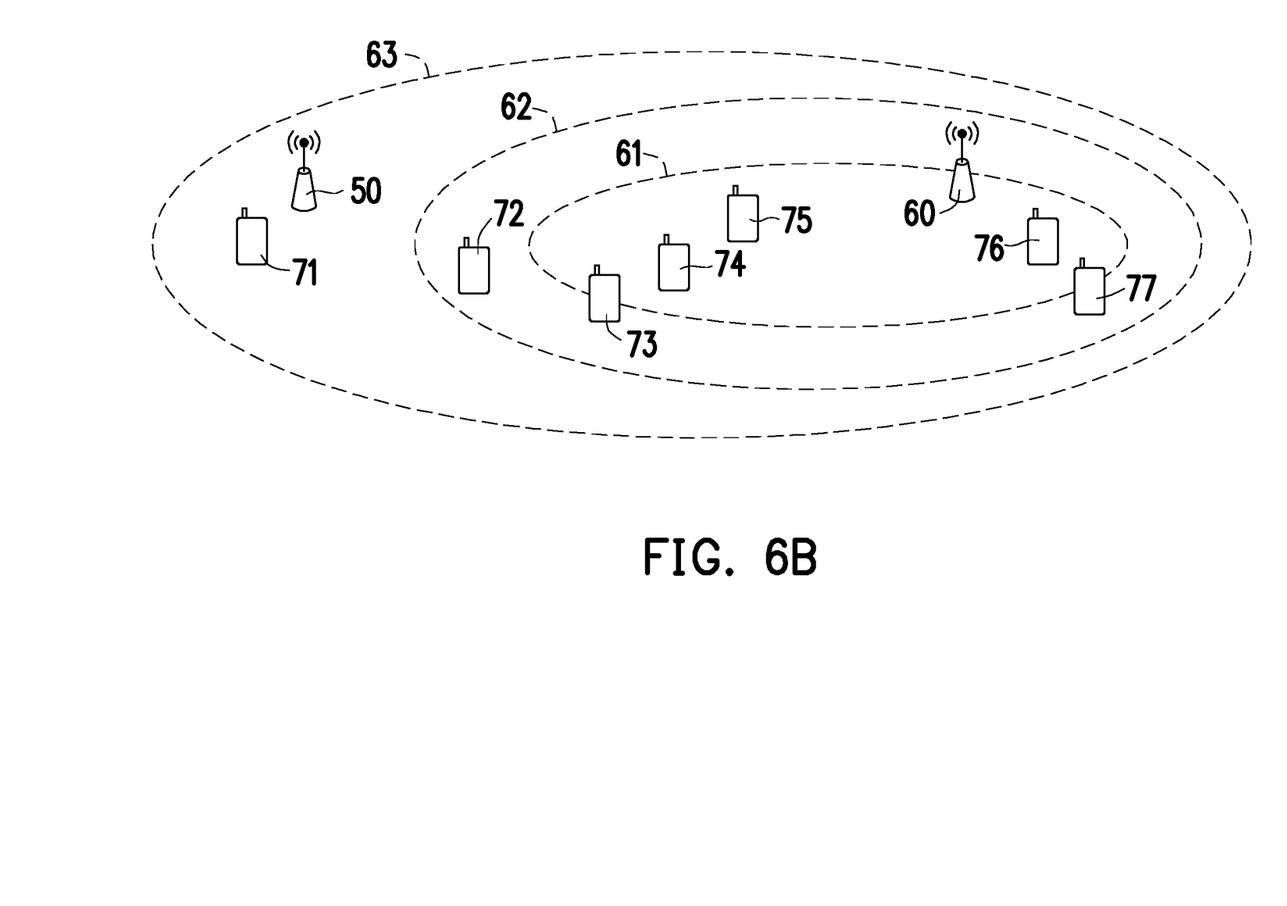

For instance, with reference to FIG. 6B, a virtualized base station 60 has a service range 61. The scaling configuration entity 104 may categorize the UEs located within the service range 61 (i.e., the UEs 74, 75, and 76) as belonging to level L1, categorize the UEs located outside the service range 61 and within a default range 62 (i.e., the UEs 72, 73, and 77) as belonging to level LX1, and categorize the UEs located outside the default range 62 and within a default range 63 (i.e., the UE 71) as belonging to level LX2. The scaling configuration entity 104 may generate an information table of the virtualized base station 60 as shown in Table 2 after completing steps S510 and S520.

TABLE 2

| UE | SLA value - bandwidth (bits per second) | SLA value - latency (millisecond) | Level |
|---|---|---|---|
| 71 | 100M | 100 | LX2 |
| 72 | 80M | 100 | LX1 |
| 73 | 100M | 50 | LX1 |
| 74 | 150M | 80 | L1 |
| 75 | 80M | 100 | L1 |
| 76 | 100M | 80 | L1 |
| 77 | 120M | 50 | LX1 |

As shown in FIG. 5, in step S530, the scaling configuration entity 104 may determine whether the reserved resources of the virtualized base station match the resource requirements corresponding to the UE set. Specifically, the UE information handler 102 may, through the monitoring entity 101, query the reserved resources of the virtualized base station from the core network or the virtualized base station. The UE resource controller 103 may pre-store a mapping table, which may include a mapping relationship between the reserved resources and the resource values (e.g., the SLA values). The scaling configuration entity 104 may convert the reserved resources of the virtualized base station queried by the UE information handler 102 into the resource values according to the mapping table. After that, the scaling configuration entity 104 may determine whether the reserved resources (i.e., the resource values) of the virtualized base station match the resource requirements of the UE set to generate a determination result. If the determination result indicates that the reserved resources of the virtualized base station match the resource requirements, the process in FIG. 5 ends. If the determination result indicates that the reserved resources of the virtualized base station do not match the resource requirements, the process advances to step S540.

In an exemplary embodiment, the scaling configuration entity 104 may determine whether a difference between the reserved resources of the virtualized base station and the resource requirements of the UE set is greater than a threshold. If the difference is greater than the threshold, the scaling configuration entity 104 may determine that the reserved resources do not match the resource requirements. If the difference is less than or equal to the threshold, the scaling configuration entity 104 may determine that the reserved resources match the resource requirements.

In step S540, the vRAN management entity 105 may expand or reduce the reserved resources of the virtualized base station based on the determination result. The vRAN management entity 105 may send an instruction to the cloud platform service through the transceiver 130 to instruct the cloud platform service to expand or reduce the reserved resources of one or more virtualized base stations, where the one or more virtualized base stations may include a plurality of DUs belonging to the same CU.

In an exemplary embodiment, if the reserved resources of the virtualized base station are greater than the resource requirements of the UE set, the vRAN management entity 105 may instruct the cloud platform service to reduce the reserved resources of the virtualized base station to save network resource expenses. If the reserved resources of the virtualized base station are less than the resource requirements of the UE set, the vRAN management entity 105 may instruct the cloud platform service to expand the reserved resources of the virtualized base station to prepare to serve the UEs that may enter the service range of the virtualized base station in the future.

The scaling configuration entity 104 and the vRAN management entity 105 of the network management system 100 may periodically execute the process depicted in FIG. 5 to update the determination result and automatically expand or reduce the reserved resources of the virtualized base station based on the updated determination result.

For instance, as shown in FIG. 6A, the scaling configuration entity 104 may select the UEs 71, 72, and 73 at level L1 and the UEs 74 and 75 at level LX1 as the selected UE set based on the location information of each UE and the default range 52. Then, the scaling configuration entity 104 may determine whether the reserved resources of the virtualized base station 50 match the resource requirements of the selected UE set. With reference to Table 1, the resource requirements of the UEs 71, 72, 73, 74, and 75 may include 510 Mbps. If the reserved resources of the virtualized base station 50 exceed 510 Mbps by a large margin, the scaling configuration entity 104 may determine that the reserved resources of the virtualized base station 50 need to be reduced. Accordingly, the vRAN management entity 105 may instruct the cloud platform service to reduce the bandwidth allocated to the virtualized base station 50. If the reserved resources of the virtualized base station 50 are much less than 510 Mbps, the scaling configuration entity 104 may determine that the reserved resources of the virtualized base station 50 need to be expanded. Accordingly, the vRAN management entity 105 may instruct the cloud platform service to expand the bandwidth allocated to the virtualized base station 50.

Figure 7:
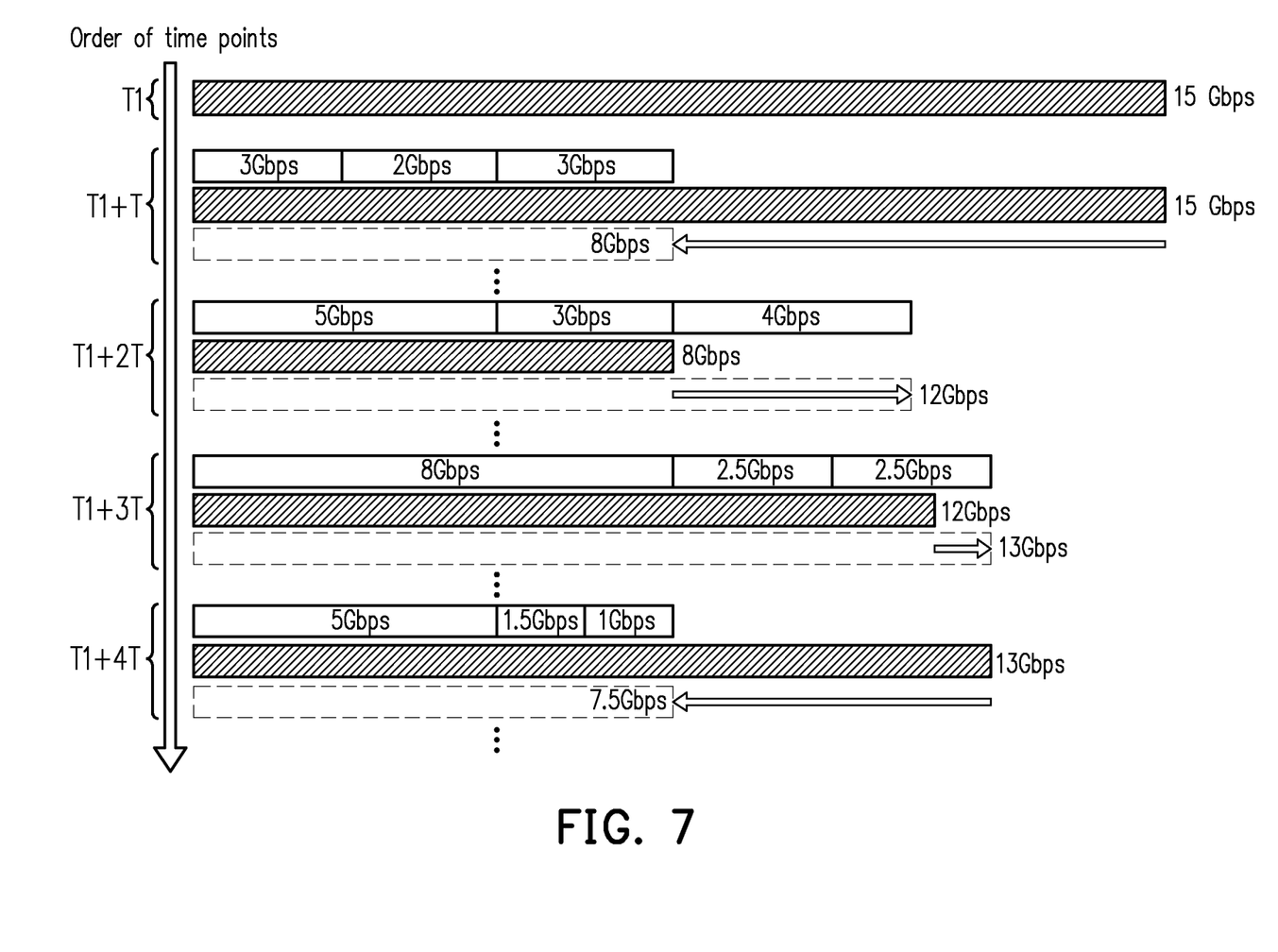
FIG. 7 is a schematic diagram illustrating expansion or reduction of reserved resources of a virtualized base station according to an exemplary embodiment of the disclosure.

FIG. 7 is a schematic diagram illustrating the expansion or reduction of reserved resources of a virtualized base station according to an exemplary embodiment of the disclosure. With reference to FIG. 6A and FIG. 7, it is assumed that the reserved resources of the virtualized base station 50 at an initial time point T1 are 15 gigabits per second (Gbps), and the virtualized base station 50 is configured to serve a specific UE set, where the UE set includes one or a plurality of UEs at level L1, one or a plurality of UEs at level LX1, and one or a plurality of UEs at level LX2. After a period T (i.e., time points T1+T), if the network management system 100 predicts that the total resource requirements of the UE set are 8 Gbps, then the network management system 100 may control the virtualized base station 50 to reduce the reserved resources from 15 Gbps to 8 Gbps. After another period T (i.e., time points T1+2T), if the network management system 100 predicts that the total resource requirements of the UE set are 12 Gbps, then the network management system 100 may control the virtualized base station 50 to expand the reserved resources from 8 Gbps to 12 Gbps. After still another period T (i.e., time points T1+3T), if the network management system 100 predicts that the total resource requirements of the UE set are 13 Gbps, then the network management system 100 may control the virtualized base station 50 to expand the reserved resources from 12 Gbps to 13 Gbps. After yet another period T (i.e., time points T1+4T), if the network management system 100 predicts that the total resource requirements of the UE set are 7.5 Gbps, then the network management system 100 may control the virtualized base station 50 to reduce the reserved resources from 13 Gbps to 7.5 Gbps.

Figure 8:
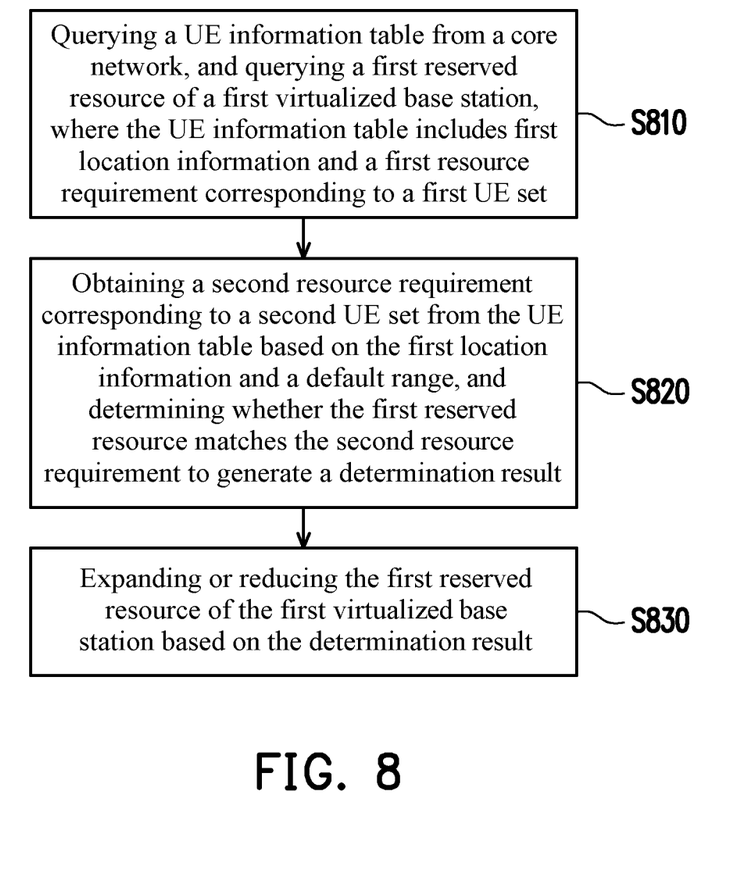
FIG. 8 is a flowchart illustrating a method of automatic adjustment for a virtualized base station according to an exemplary embodiment of the disclosure.

FIG. 8 is a flowchart illustrating a method of automatic adjustment for a virtualized base station according to an exemplary embodiment of the disclosure, where the method may be implemented by the network management system 100 shown in FIG. 1. In step S810, the UE information table is queried from the core network, and the first reserved resource of the first virtualized base station is queried, where the UE information table includes the first location information and the first resource requirement corresponding to the first UE set. In step S820, the second resource requirement corresponding to the second UE set is obtained from the UE information table based on the first location information and the default range, and it is determined whether the first reserved resource matches the second resource requirement to generate the determination result. In step S830, the first reserved resource of the first virtualized base station is expanded or reduced based on the determination result.

To sum up, the network management system provided in one or more exemplary embodiments of the disclosure may predict the number of resources to be consumed by the virtualized base station in the future based on the location information and the resource requirements of the UEs. The network management system may dynamically adjust the reserved resources of the virtualized base station according to the prediction results, thereby meeting the resource requirements of the UEs without wasting the network resources.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A network management system of automatic adjustment for a virtualized base station, the system comprising:
   a transceiver;
   a storage medium, storing a plurality of modules; and
   a processor, coupled to the storage medium and the transceiver, which accesses and executes the modules, wherein the modules comprise:
   a monitoring entity, communicating with a core network through the transceiver;
   a user equipment information handler, querying a user equipment information table from the core network through the monitoring entity, and querying a first reserved resource of a first virtualized base station through the monitoring entity, wherein the user equipment information table comprises first location information and a first resource requirement corresponding to a first user equipment set;
   a scaling configuration entity, obtaining a second resource requirement corresponding to a second user equipment set from the user equipment information table based on the first location information and a default range and determining whether the first reserved resource matches the second resource requirement to generate a determination result, comprising:
      determining a difference between the first reserved resources and the second resource requirement, and
      in response to determining that the difference being less than or equal to a threshold, determining that the first reserved resource matches the second resource requirement; and
   a virtualized radio access network management entity, expanding or reducing the first reserved resource of the first virtualized base station based on the determination result.

2. The network management system as claimed in claim 1, wherein the modules further comprise:
   a user equipment resource controller, storing the default range and a mapping table, wherein
   the scaling configuration entity converts the first reserved resource into a resource value according to the mapping table and determines whether the resource value matches the second resource requirement to generate the determination result.

3. The network management system as claimed in claim 2, wherein the resource value comprises a first service-level agreement value, and the second resource requirement comprises a second service-level agreement value.

4. The network management system as claimed in claim 1, wherein a service range of the first virtualized base station is included in the default range.

5. The network management system as claimed in claim 1, wherein the user equipment information handler queries a list of the first user equipment set through a unified data management function of the core network to obtain the user equipment information table.

6. The network management system as claimed in claim 1, wherein the user equipment information handler queries the first resource requirement through a policy control function of the core network.

7. The network management system as claimed in claim 1, wherein the user equipment information handler queries the first location information through a gateway mobile location center function or a location retrieval function of the core network.

8. The network management system as claimed in claim 1, wherein the virtualized radio access network management entity expands or reduces the first reserved resource of the first virtualized base station and the second reserved resource of the second virtualized base station based on the determination result, and the first virtualized base station and the second virtualized base station belong to a same central unit.

9. The network management system as claimed in claim 8, wherein the first virtualized base station comprises a distributed unit.

10. The network management system as claimed in claim 1, wherein the scaling configuration entity periodically updates the determination result.

11. A method for automatic adjustment of a virtualized base station, the method comprising:
   querying a user equipment information table from a core network and querying a first reserved resource of a first virtualized base station, wherein the user equipment information table comprises first location information and a first resource requirement corresponding to a first user equipment set;
   obtaining a second resource requirement corresponding to a second user equipment set from the user equipment information table based on the first location information and a default range and determining whether the first reserved resource matches the second resource requirement to generate a determination result, comprising:
      determining a difference between the first reserved resources and the second resource requirement, and
      in response to determining that the difference being less than or equal to a threshold, determining that the first reserved resource matches the second resource requirement; and
   expanding or reducing the first reserved resource of the first virtualized base station based on the determination result.

* * * * *